June 10, 1930. A. OBERLE 1,763,063
PROCESS FOR MAKING CARBONACEOUS MATERIAL
Filed Aug. 18, 1924
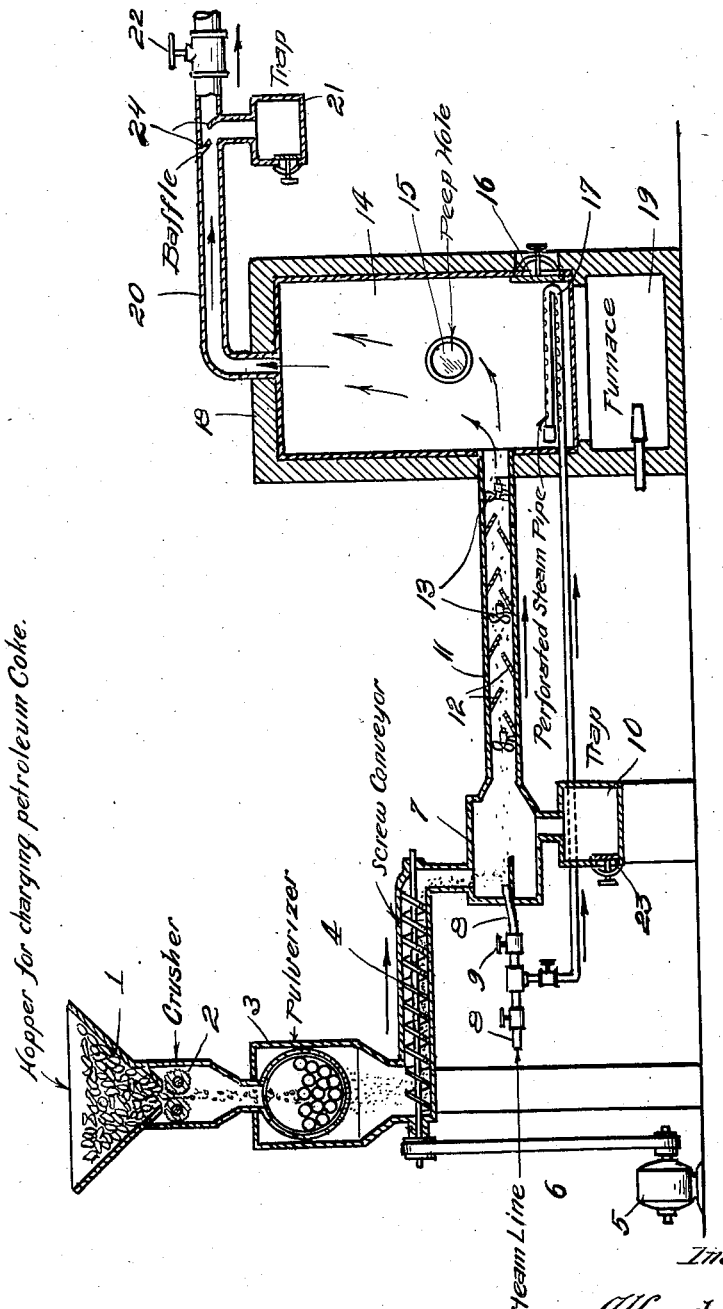
Inventor:
Alfred Oberle Patented June 10, 1930

1,763,063

UNITED STATES PATENT OFFICE

ALFRED OBERLE, OF OAK PARK, ILLINOIS

PROCESS FOR MAKING CARBONACEOUS MATERIAL

Application filed August 18, 1924. Serial No. 732,671.

This invention relates to improvements in a process for making carbonaceous material, particularly for making a carbon which may be readily molded.

Among the salient objects of the invention are, to provide a process in which petroleum carbon or petroleum coke, resulting from the destructive distillation of petroleum oils, is refined or treated to produce a purified carbonaceous substance of uniform characteristics which may be readily molded and utilized for innumerable purposes, particularly in commercial electrical work. The process further provides for the production of volatile material which may be used for making carbon black or lamp black as a by-product.

The single figure is a diagrammatic side elevational view of a preferred type of apparatus. It is understood, however, that in which is interposed a second trap 21 for intercepting any solid material which is carried over mechanically with the vapors passing off from the chamber. The vapor line is regulated by a throttle valve 22.

Referring now to the method of operation, a petroleum coke or petroleum carbon, such as the carbonaceous material recovered from cracking in the form of a cokey mass, is introduced into the hopper 1, passes through the crusher 2 where it is broken up and disintegrated into relatively small pieces. From the crusher it is introduced into the ball mill, or other suitable type of pulverizer, where the particles are further reduced in size, preferably to a finely divided powder form sufficiently small to pass a 300-mesh screen. In this condition, the carbon is delivered into the screw conveyor 4 and is carthe carbonaceous particles separate out while any volatile hydrocarbons combining with the steam pass off through the vapor line 20 for further treatment as hereinafter explained.

The carbon separated out in the expansion chamber is prevented from packing or caking in a solid mass in the bottom of the expansion chamber due to the injection of steam through the perforated pipe 17. In this way, the carbon may be kept in a loose, fluffy condition, permitting it to be easily removed from the chamber and more readily susceptible to subsequent molding or forming. Conditions in the expansion chamber may be viewed through a peep hole shown at 15. The steam and volatile material, passing off through the vapor line 20, is obstructed and its velocity retarded by means of baffle members 24 which serve to separate out any solid particles which are entrained mechanically with the vapors. These particles fall down into the trap 21 from which they may be removed from time to time as is necessary. The steam and volatile hydrocarbons passing the vapor line 20, are preferably directed to a second stage of treatment not shown into which they are injected into either pulverized coal or coke or are burned with natural gas or liquid hydrocarbons under conditions of incomplete combustion to form lampblack or carbonblack as a by-product. The volatile material carried off with the steam in this manner, contains considerable hydrocarbons which would yield quantities of lampblack if burned in this manner and would prove a valuable addition to the process.

Under normal conditions, it would be necessary to add either natural gas or a solid or liquid hydrocarbon to this mixture to produce sufficient quantities of lampblack or carbon black for commercial recovering. It will be found, however, that the hydrocarbon content of the vapors increases as the process is continued and less and less additional hydrocarbon material need be added for a satisfactory recovery of the by-product.

The carbonaceous material, which is the important factor of recovering, namely, the particles of carbon settling in the expansion chamber 14, is a carbon having high absorptive qualities which has further characteristics of producing, when molded, a dense solid of remarkable purity and uniformity. This carbon, besides having high absorptive qualities, is pliable and readily molded with the addition of slight quantities of adhesive materials. The material when molded is especially adapted to electrical purposes, particularly for producing generator brushes and for like purposes where smooth, uniform characteristics are essential and the material relatively free of impurities such as silica and the like which result in scorating or mutilating the high velocity surfaces upon which it contacts. Further, it has certain slight lubricating characteristics which lend it adaptable to processes of this character.

Heretofore, it has been the practice to produce molded articles of this character with mixtures of moldable carbon containing a mixture of lampblack and adhesive and certain denser carbonaceous materials in order to supply sufficient body to the lampblack or carbon black. It has been found by treating carbon in the manner described, that molded articles may be readily produced from the carbon formed in this way. Normally, it is necessary to add an extraneous adhesive substance in order to produce the proper bonding together of the structure.

The importance of the absorptive qualities of the carbon lies in the fact that it may be bonded together in molding by impregnation with certain hydrocarbons, phenol, cellulose preparations, solutions of salts and solutions of metals. Normally, these combinations are more effectively made by the use of heat and pressure. Further bonding materials which are particularly adapted to bond together the absorptive carbon particles, are such substances as pitch, tar and other hydrocarbon materials. This substance, or freshly formed carbon, fills out the vacuoles, holes, or other spaces besides having binding qualities. It is true the use of adhesive materials of this character introduce impurities, but the high absorptive character of the carbon made in the process hereinbefore described necessitates the use of but small quantities of adhesive material.

A further method of bonding together the particles is to pass the volatile material passing off in vapor from the expansion stage through the freshly prepared carbon. This permits the absorptive carbon particles to take up certain of the volatile material and lends to the carbonaceous particles adhesive qualities which permits their being molded and bonded together with the additional use of a minimum amount of binding substances.

Further combinations may be effected for innumerable purposes with kaolin (china clay), metalkaolin, sillimanite and similar clays used for binding texture or adhesion. Mixtures of this character are particularly adapted for lead pencils, marking lead, and the like.

I claim as my invention:

1. A process for making activated carbonaceous material, comprising the steps of disintegrating petroleum carbon, admixing steam thereto to drive off the volatile material therefrom, and separating and collecting the purified solid carbonaceous substance.

2. A process for making activated carbonaceous material, consisting in disintegrating petroleum carbon to a finely divided condition, thoroughly admixing superheated steam therewith, separating the carbonaceous material from the solid impurities and volatile products.

3. A process for making carbonaceous material, consisting in distintegrating petroleum carbon to a finely divided condition, thoroughly admixing superheated steam therewith, separating the carbonaceous material from the solid impurities and volatile products, oxidizing said volatile products with an insufficient amount of air to cause incomplete combustion and the production of carbon-black as a by-product.

4. A process of making carbonaceous material, consisting in disintegrating petroleum carbon to a comminuted state, intimately intermixing superheated steam therewith by combining the finely divided carbon with a moving current of steam while creating a turbulent condition in the mixture, passing the mixture to a relatively stagnant stage, and separating the solid impurities and volatile material from the purified carbonaceous substance.

5. A process for making a carbonaceous material consisting in disintegrating petroleum carbon to a finely divided condition, admixing superheated steam therewith while maintaining the carbon and steam in a turbulent condition to drive off the volatile constituents, passing the admixture to a relatively stagnant stage and separating the solid impurities and the volatile material, directing the volatile material to a separate stage and there burning the volatile constituents with a hydrocarbon gas and recovering lamp black therefrom.

ALFRED OBERLE.